(12) United States Patent
Kraeutle (10) Patent No.: US 9,412,873 B1
(45) Date of Patent: Aug. 9, 2016

(54) ALIGNMENT FEATURES FOR IMPROVED ALIGNMENT OF LAYERED COMPONENTS OF A DEVICE DISPLAY

(71) Applicant: Amazon Technologies, Inc., Reno, NV (US)

(72) Inventor: Christopher John Kraeutle, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 145 days.

(21) Appl. No.: 14/028,124

(22) Filed: Sep. 16, 2013

(51) Int. Cl.
*H01L 23/544* (2006.01)
*H01L 21/00* (2006.01)
*H01L 29/786* (2006.01)
*H01L 29/66* (2006.01)

(52) U.S. Cl.
CPC .......... *H01L 29/786* (2013.01); *H01L 29/6675* (2013.01)

(58) Field of Classification Search
CPC ........................... H01L 23/544; H01L 21/682
USPC ................... 438/462, 401, 975; 257/797
See application file for complete search history.

(56) References Cited

U.S. PATENT DOCUMENTS

| 7,271,426 | B2 * | 9/2007 | Horio | H01L 33/08 257/778 |
| 7,629,613 | B2 * | 12/2009 | Sohn et al. | 257/72 |
| 8,841,784 | B2 * | 9/2014 | Ishida | H01L 23/544 257/778 |
| 2012/0110868 | A1 * | 5/2012 | Abbondanzio | B29C 63/0004 33/645 |

* cited by examiner

*Primary Examiner* — Calvin Lee
(74) *Attorney, Agent, or Firm* — Sutherland Asbill & Brennan LLP (57) ABSTRACT

Device display assemblies that include layered components provided with alignment features are disclosed. Protective sheets that are adhered to other layered components of a display assembly may be provided with alignment features that are utilized as part of an alignment process to accurately align the protective sheets with respect to the other layered components as well as to align the display assembly with respect to other device components such as a cover glass. Alignment features may also be provided in other layered components of a display assembly in addition to the protective sheets.

22 Claims, 5 Drawing Sheets

FIG. 5

ALIGNMENT FEATURES FOR IMPROVED ALIGNMENT OF LAYERED COMPONENTS OF A DEVICE DISPLAY

BACKGROUND

A display for an electronic device typically includes a number of layered components. For example, in an electrophoretic display, an electro-optic layer may be provided that includes electrically charged particles that reflect incident light towards a viewer when the particles are located towards a viewing side of a display. The charged particles may be suspended in a colored hydrocarbon oil or other pigmented medium which may, in turn, be encapsulated in discrete microcapsules. The electro-optic medium may be provided between a pair of electrode layers. An array of pixel electrodes forming part of one of the electrode layers may be aligned with the electro-optic medium in such a way that a voltage applied across a pixel electrode corresponding to a particular pixel may cause migration of the charged particles within a corresponding microcapsule towards or away from the electrode, thereby determining the optical state of the pixel. In the case of an emissive display such as a backlit liquid crystal display (LCD), application of a voltage across a pair of electrodes may cause liquid crystal molecules of a liquid crystal medium provided between the electrodes to change orientation, thereby determining an amount of light emitted through the corresponding pixel, and thus, an optical state of the pixel.

In addition to the electrode and electro-optic layers described above, one or more protective layers may be provided as part of a display assembly. Alignment of each layered component of a display with respect to other layered components of the display as well as other device components is an important factor in ensuring proper operation and performance of the display.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa. The drawings are not necessarily drawn to scale.

DETAILED DESCRIPTION

Overview

This disclosure relates to electronic displays that include layered components provided with alignment features that may be used to align the layered components with respect to other layered components of the display as well as to align the display with respect to other device components. Alignment features may be formed in, on, or through one or more layers of a display. For example, one or more protective sheets of a display may be provided with one or more alignment features. Further, other components of a display (e.g., image producing layers) may be provided with one or more alignment features. The alignment features may include any suitable design feature that facilitates alignment of the layer(s) that include the alignment features with respect to other layers of a display as well as, potentially, alignment of a display assembly with respect to other device components such as a display panel, a device chassis, and so forth. Alignment features as described herein provide improved alignment of display components with respect to each other and with respect to other device components. For example, alignment features described herein provide improved alignment of protective sheets of a display with respect to image producing layers of the display as compared to that which is obtainable in conventional displays. As another non-limiting example, alignment features described herein provide improved alignment of a viewing opening of a display panel or cover glass with respect to an active area of a display assembly.

The alignment features may include, but are not limited to, an aperture, a slot, a notch, a printed marking, an etched marking, and so forth. While illustrative alignment features are described herein, it should be appreciated that alignment features encompassed by this disclosure are not limited to those explicitly set forth herein and may include any suitable indicator, marking, or the like that may be formed in, on, or through a display component and which may be used to align the display component with other display components and/or with other device components.

A variety of types of electronic displays exist. Electronic displays include, for example, reflective displays that utilize incident light to generate visual information. Examples of reflective displays include electrophoretic displays (e.g., electronic paper ("e-paper") or electronic ink ("e-ink") type displays), interferometric displays, cholesteric displays (e.g., cholesteric liquid crystal displays), electrowetting displays, and so forth. Electronic displays also include, for example, emissive displays that emit light to generate visual information. Examples of emissive displays include backlit liquid crystal displays (LCDs), plasma displays, light-emitting diode (LED) displays, organic light-emitting diode (OLED)

displays, and so forth. In addition, electronic displays that exhibit both reflective and emissive properties exist.

An electronic display such as a reflective and/or emissive display may be formed of various layered components. While the following discussion and various example embodiments of the disclosure may be described with reference to electrophoretic displays such as e-paper or e-ink displays, it should be appreciated that embodiments of the disclosure are applicable to any of a variety of other types of displays that may include layered components different from those described herein in connection with electrophoretic displays. Accordingly, any reference to example electrophoretic displays shall not be deemed limiting in any way.

An example electronic display may include a thin-film-transistor (TFT) layer. The TFT layer may be formed via a multi-stage process in which a thin film of silicon (e.g., amorphous silicon, polycrystalline silicon, single-crystal silicon, etc.) is deposited on a glass substrate using a thin film deposition technique such as, for example, plasma-enhanced chemical vapor deposition (PECVD). The glass substrate may be, for example, a flexible thin glass substrate that may have a thickness in the range of approximately 0.05 mm to approximately 3 mm. Subsequent to deposition, the thin film of silicon may be subjected to photolithography and etching processes, and a dielectric layer and metallic contacts for the source, drain and gate electrodes may be deposited to produce a desired pattern of individual transistors.

An electrode layer such as a layer of Indium-Tin-Oxide (ITO) may be deposited on the TFT layer. The ITO layer may be light-transmissive such as, for example, in the case of emissive displays. The TFT layer having the ITO layer deposited thereon may initially be bonded to a thicker carrier glass using, for example, an adhesive such as an optically clear adhesive (OCA). The assembly including the ITO and TFT layers and the carrier glass may support formation of multiple displays. For example, multiple individual displays may be formed from the assembly using a cutting process such as, for example, a scribe wheel process, a laser cutting process, and so forth.

Upon formation of individual displays using an appropriate cutting process, a Frontplane Laminate (FPL) layer may be bonded to the ITO layer. The FPL layer may include, for example, a light-transmissive electrically-conductive layer, a layer of an electro-optic medium in electrical contact with the electrically-conductive layer, an adhesive layer, and a release layer. The light-transmissive electrically-conductive layer may be, for example, an ITO layer. As part of the process for bonding the FPL layer to the TFT layer, the release layer may be removed to reveal the adhesive layer, which may then be adhered to the TFT layer by a laminator. More specifically, the adhesive layer may be adhered to the ITO layer formed on the TFT layer. For at least certain types of displays (e.g., backlit LCD displays), the release layer may be transparent.

In certain example embodiments, a protective sheet may be applied to the ITO layer of the FPL layer. This protective sheet may be referred to herein as a front protective sheet (FPS). The term "front" may be used herein for ease of explanation, and without limitation, to refer to a position that is more proximate to a user viewing the display in a typical viewing state. The FPS may be formed, for example, of a polymer resin such as the thermoplastic polymer polyethylene terephthalate (PET) or any other suitable polymer material. In certain example embodiments, an optically clear adhesive (OCA) may be used to adhere the FPS to the ITO electrode layer of the FPL layer.

In certain example embodiments, subsequent to adherence of the FPL layer to the TFT layer and adherence of the FPS to the ITO sub-layer of the FPL layer, the carrier glass may be removed from the TFT layer. A back protective sheet (BPS) may then be adhered to the TFT layer using, for example, an OCA. The term "back" may be used herein for ease of explanation, and without limitation, to refer to a position that is more distal from a user viewing the display in a typical viewing state. Similar to the FPS, the BPS may be formed of a polymer material such as PET. The FPS and BPS may provide a moisture barrier that prevents water or other debris from contaminating the display assembly. In certain embodiments, an edge surface of a protective sheet (e.g., FPS and/or BPS) may extend beyond an edge surface of a display layer to which the protective sheet is adhered, thereby creating an overhang. In such embodiments, an edge sealant may be applied along surfaces defining the overhang in order to complete the moisture barrier and completely seal the display assembly.

In accordance with one or more example embodiments of the disclosure, in order to facilitate proper alignment of the FPS and BPS to the ITO sub-layer of the FPL layer and the TFT layer, respectively, the FPS and the BPS may each be provided with a respective one or more alignment features. In certain example embodiments, the alignment features may include mechanical features that are die-cut into the protective sheets as part of a die-cut process for forming the protective sheets. In additional or alternative example embodiments, the alignment features may be printed on or etched into one or both of the protective sheets using a chemical or laser printing or etching process.

The alignment features may take on any suitable form. For example, the alignment features may include an aperture, slot, notch, indentation, printed marking, etched marking, or the like that is formed in, on, or through a protective sheet. In certain example embodiments, the FPS may be provided with a first alignment feature and the BPS may be provided with a second alignment feature at corresponding opposing locations of the FPS and BPS, respectively.

In one or more example embodiments of the disclosure, the alignment features may facilitate alignment of the protective sheets to a display assembly. For example, one or more alignment features formed on, in, or through the FPS may be used as reference point(s) by an alignment system that aligns the FPS with respect to the ITO sub-layer of the FPL layer prior to adhering the FPS to the ITO sub-layer. Similarly, an alignment system may utilize one or more alignment features formed on, in, or through the BPS as reference point(s) for aligning the BPS with respect to the TFT layer prior to adherence of the BPS to the TFT layer. The alignment system may perform an alignment process that may include automated operations, manual operations, or some combination thereof.

In certain example embodiments, the one or more alignment features formed on, in, or through a protective sheet may be utilized in conjunction with one or more fiducial markers formed as part of a display layer to which the protective sheet is adhered in order to ensure proper alignment between the protective sheet and the display layer. As used herein, the term "fiducial marker" may refer to a design feature of a display layer that is detectable by an optical imaging system and which serves as a point of reference for connecting components to the display layer and/or for aligning other layers of a display assembly to the display layer that includes the fiducial marker. For example, the TFT layer may be provided with one or more fiducial markers that are utilized to properly align the FPL layer to the TFT layer.

Providing protective sheets that include alignment features in accordance with example embodiments of the disclosure may allow for highly accurate alignment of the protective sheets with respect to fiducial markers provided as part of the display layers to which such protective sheets are adhered. As such, the alignment features of the protective sheets may be further utilized to enable accurate alignment of a display panel (e.g., a cover glass) with respect to a display assembly such that the active area of the display accurately aligns with the viewing window of the cover glass. More specifically, the alignment features of protective sheets in accordance with example embodiments of the disclosure provide for a more accurate alignment of the protective sheets with respect to fiducial markers of display layers to which the protective sheets are adhered than is obtainable in conventional displays.

This improved alignment achievable as a result of the alignment features of the protective sheets may then be utilized to obtain a more accurate alignment of the cover glass to the display assembly than is obtainable in conventional devices. The alignment features of the protective sheets may be further utilized to obtain improved alignment of other device components (e.g., a front light, a device chassis, etc.) with respect to the display assembly. As such, the alignment features of the protective sheets may be utilized in various downstream manufacturing and testing processes.

In addition, in one or more example embodiments of the disclosure, other display layers in addition to the protective layers may be provided with alignment features. For example, the TFT layer, the FPL layer, and so forth may be provided with alignment features in addition to, or in lieu of, fiducial markers that may otherwise be provided for such layers. Alignment features provided for such additional display layers may further enhance or optimize alignment of layered components of a display in accordance with example embodiments of the disclosure.

Various illustrative embodiments of the disclosure have been described. These and other embodiments will be described in greater detail hereinafter through reference to the accompanying drawings.

Illustrative Devices

Figure 1:
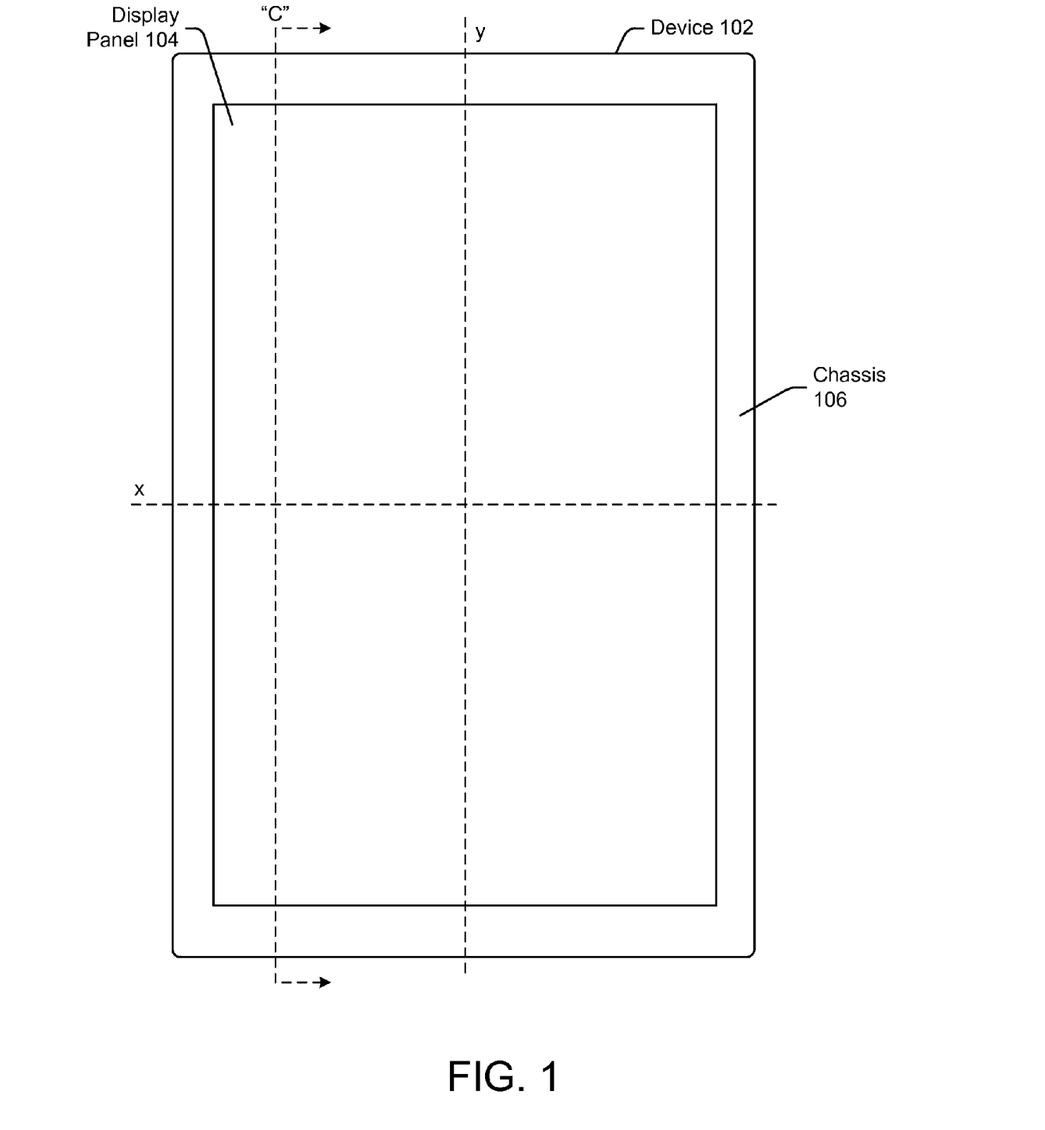
FIG. 1 schematically depicts an illustrative user device that includes a display that may include layered components provided with alignment features that facilitate alignment of the layered components in accordance with one or more example embodiments of the disclosure.

FIG. 1 schematically depicts an illustrative user device 102 that includes a display that may include layered components provided with alignment features that facilitate alignment of the layered components in accordance with one or more example embodiments of the disclosure. The user device 102 may include any suitable device that includes a display capable of generating and presenting visual information. For example, the user device 102 may include a smartphone or other device with cellular voice and/or data capabilities, a tablet device, an electronic reader ("e-reader") device, a desktop computer, a laptop computer, a workstation, and so forth.

The user device 102 may include any suitable type of display such as, for example, a reflective display, an emissive display, or a display that exhibits both reflective and emissive characteristics. For example, the user device 102 may include a reflective display such as an electrophoretic display (e.g., e-paper or e-ink type display), an interferometric display, a cholesteric display, an electrowetting display, or the like. Alternatively, the user device 102 may include an emissive display such as a backlit LCD, a plasma display, a LED display, an OLED display, and so forth.

The display of the user device 102 may include an active area that includes an array of pixels capable of generating visual information. The active area may be surrounded by a visible area of the display having dimensions that are slightly larger than the active area. The visible area of the display may be provided in order to allow for effective alignment of a viewing window of a display panel 104 (e.g., a cover glass) with the active area of the display. The display assembly and other illustrative components of the user device 102 (e.g., illuminator(s), device circuitry, etc.) may be arranged within a chassis 106 or exterior casing. In certain example embodiments, the display panel 104 may be a touchscreen panel such as, for example, a resistive touchscreen panel, a capacitive touchscreen panel, and so forth.

A horizontal dashed line labeled 'x' and a vertical dashed line labeled 'y' are also depicted in FIG. 1. These dashed lines may represent center lines corresponding to the active area of the display. As will be described in more detail hereinafter, alignment features may be provided in, on, or through one or more layers of the display based at least in part on the center lines of the active area of the display in order to obtain improved alignment accuracy of the various layers of the display with respect to each other as well as improved alignment accuracy of the display with respect to other components of the user device 102. A further dashed line labeled 'C' is also depicted and may represent a cross-section line.

Figure 2:
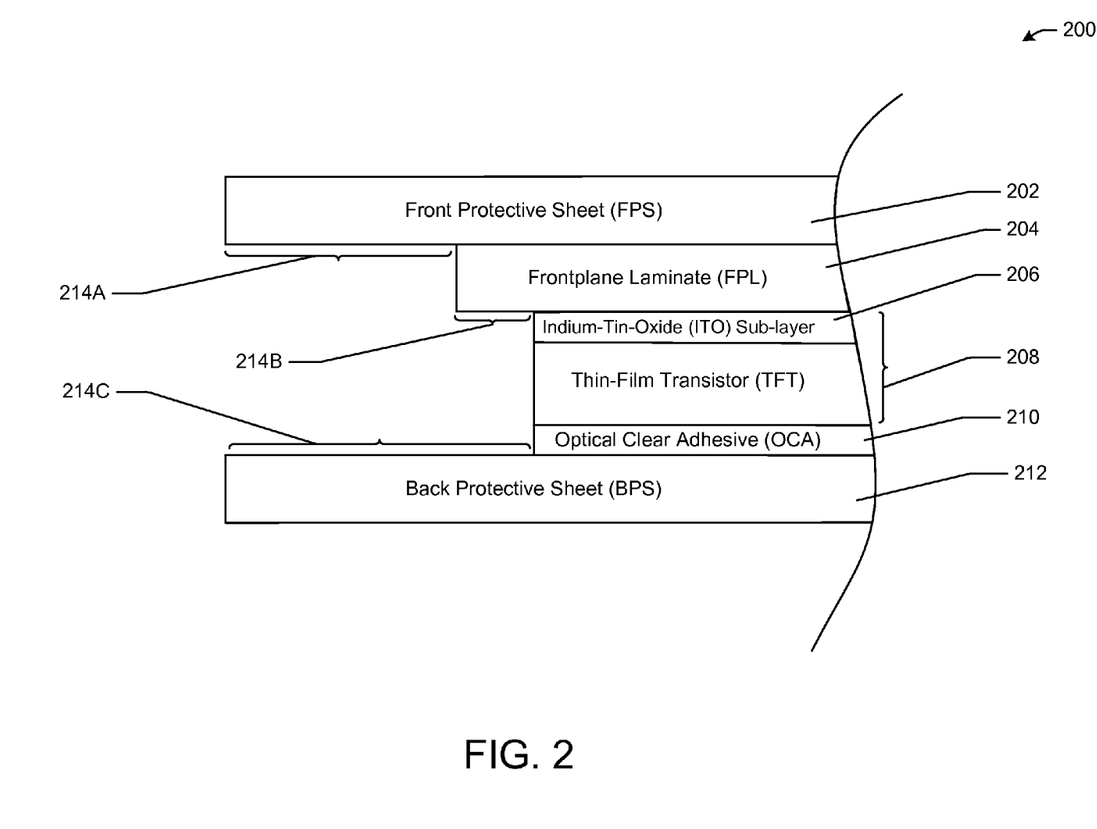
FIG. 2 schematically depicts an illustrative portion of a cross-section of an illustrative display assembly of the device depicted in FIG. 1 taken along line "C," where the cross-section includes various illustrative layered components of the display assembly.

As previously described, an electronic display such as a reflective and/or emissive display may be formed of various layered components. FIG. 2 schematically depicts an illustrative portion of a cross-section of an illustrative display assembly 200 of the device 102 depicted in FIG. 1 taken along line "C," where the display assembly 200 includes various illustrative layered components.

In one or more example embodiments of the disclosure, the display assembly 200 may include a TFT layer 208. The TFT layer 208 may be formed via a multi-stage process in which a thin film of silicon (e.g., amorphous silicon, polycrystalline silicon, single-crystal silicon, etc.) is deposited on a glass substrate using a thin film deposition technique. The deposited silicon film is then subjected to photolithography and etching processes, and a dielectric layer and metallic contacts for the source, drain and gate electrodes are deposited to produce a desired pattern of individual transistors. A variety of types of TFT structures are possible such as a staggered structure in which the source and drain electrodes are provided on one side of the semiconductor material and the gate electrode is provided on an opposing side or a coplanar structure in which the source, drain, and gate electrodes are all provided on a same side of the semiconductor material. In addition, inverted structures are possible in which the gate electrode is the first layer deposited on the glass substrate.

A light-transmissive electrode layer 206 such as a layer of Indium-Tin-Oxide (ITO) may be deposited on the TFT layer 208. Although depicted as a continuous layer in FIG. 2, the ITO layer 206 may be formed as a series of discrete, discontinuous ITO layers with each such ITO layer corresponding to a particular pixel of the display assembly 200. In various example embodiments, the combination of the ITO layer 206 and the TFT layer 208 may be considered the TFT layer 208. That is, the ITO layer 206 may be a sub-layer of the TFT layer 208. In other example embodiments, the ITO layer 206 may be considered a separate layer from the TFT layer 208. The TFT layer 208 having the ITO layer 206 deposited thereon may initially be bonded to a thicker carrier glass (not shown) using, for example, an optically clear adhesive (OCA) such as, for example, OCA 210 depicted in FIG. 2 (which will be described in greater detail hereinafter). The carrier glass may facilitate, among other things, bonding of various layers of the display assembly 200 (e.g., bonding of the ITO layer 206 to the TFT layer 208, bonding of an FPL layer 204 (described below) to the ITO layer 206, etc.) as well as transport of the assembly 200. The assembly 200 including the ITO layer 206, the TFT layer 208, and the carrier glass (not shown) may support formation of multiple displays. For example, multiple individual displays may be formed from the assembly using a cutting process such as, for example, a scribe wheel process, a laser cutting process, and so forth.

Upon formation of individual displays using an appropriate cutting process, the FPL layer 204 may be bonded to the ITO layer 206. The FPL layer 204 may include, for example, a light-transmissive electrically-conductive layer, a layer of an electro-optic medium in electrical contact with the electrically-conductive layer, an adhesive layer, and a release layer. It should be noted that these sub-layers are not separately depicted in FIG. 2 as part of the FPL layer 204. The light-transmissive electrically-conductive layer may be, for example, an ITO layer. The ITO sub-layer forming part of the FPL layer 204 may be, in various example embodiments, an electrode layer that is common to all pixels of the display assembly 200. As part of the process for bonding the FPL layer 204 to the TFT layer 208, the release layer of the FPL layer 204 may be removed to reveal the adhesive layer, which may then be adhered to the TFT layer 208 by a laminator. More specifically, the adhesive layer may be adhered to the ITO layer 206 formed on the TFT layer 208. For at least certain types of displays (e.g., backlit LCD displays), the release layer may be transparent.

In the case of an electrophoretic display such as an e-ink display, the combination of the FPL layer 204 and the TFT layer 208 may allow for the generation of visual information by the display. For example, the electro-optic layer of the FPL layer 204 may include electrically-charged particles including, for example, positively charged white pigment particles and negatively charged black pigment particles suspended in a clear fluid medium and encapsulated in microcapsules. The microcapsules may be provided between opposing electrode layers. In certain displays, the electrode layer more proximate to a viewing side of the display may be a common electrode layer that is common to all pixels of the display and may be formed, for example, of an ITO material. The electrode layer provided on an opposing side of the electro-optic layer may be, for example, the ITO sub-layer 206 deposited on the TFT layer 208 and may, in certain displays, include discrete ITO electrode layers corresponding to pixels of the display.

In electronic displays such as an e-ink display or a liquid crystal display (LCD), the optical state of a pixel may be determined by the voltage that is applied across an electrode corresponding to that pixel. In an active-matrix display, each pixel may be separately addressed. For example, each pixel may include a respective transistor and one or more capacitors forming part of the TFT layer 208 that operate in conjunction to actively maintain the optical state of the pixel while other pixels are being addressed. Each transistor may operate as a switch such that when a suitable voltage is applied to the gate electrode (e.g., a voltage that exceeds a threshold voltage), current flows from the source electrode to the drain electrode thereby charging a pixel capacitor. The pixel capacitor may be configured to maintain this charge when the applied voltage is removed and other pixels are addressed. In the case of the illustrative electrophoretic displays discussed above, depending on the nature of the voltage applied across an electrode (e.g., positive or negative), either the positively-charged or the negatively-charged particles within a corresponding microcapsule may migrate towards the electrode, thereby resulting in either a black or white image being displayed for the corresponding pixel.

Still referring to FIG. 2, in certain example embodiments, a front protective sheet (FPS) 202 may be applied to the light-transmissive electrically conductive layer (e.g., ITO layer) of the FPL layer 204. The FPS may be formed, for example, of a polymer resin such as the thermoplastic polymer polyethylene terephthalate (PET) or any other suitable polymer material. Although not depicted in FIG. 2, in certain example embodiments, an optically clear adhesive (OCA) may be used to adhere the FPS 202 to the ITO electrode sub-layer of the FPL layer 204.

In certain example embodiments, subsequent to adherence of the FPL layer 204 to the TFT layer 208 (or more specifically the ITO sub-layer 206 that may form part of the TFT layer 208) and adherence of the FPS 202 to the ITO sub-layer of the FPL layer 204, the carrier glass may be removed from the TFT layer 208. A back protective sheet (BPS) 212 may then be adhered to the TFT layer 208 using, for example, an OCA 210. Similar to the FPS 202, the BPS 212 may be formed of a polymer material such as PET. The FPS 202 and BPS 212 may provide a moisture barrier that prevents water or other debris from contaminating the display assembly.

Edge surfaces of various layers of the display assembly 200 depicted in FIG. 2 may extend beyond edge surfaces of other layers of the display assembly so as to result in various overhangs. For example, an edge surface of the FPS 202 may extend beyond an edge surface of the FPL layer 204 resulting in overhang 214A. Similarly, an edge surface of the FPL layer 204 may extend beyond an edge surface of the TFT layer 208 resulting in overhang 214B and an edge surface of the BPS 212 may extend beyond the edge surface of the TFT layer 208 resulting in overhang 214C. In such embodiments, an edge sealant may be applied along surfaces defining the overhangs 214A-214C in order to complete the moisture barrier and completely seal the display assembly.

The layers depicted in FIG. 2 are merely illustrative layers that may be provided as part of an electrophoretic display or similar type of display. Additional or alternative layers may be provided in connection with electrophoretic displays or other types of displays such as, for example, emissive displays (e.g., LCD displays, plasma displays, etc.). While example embodiments of the disclosure may be described herein with reference to the example layered components depicted in FIG. 2, it should be appreciated that embodiments of the disclosures are also applicable to any of a variety of other types of displays that may include additional or alternative layered components. For example, displays that include alternative or additional layers beyond those depicted in FIG. 2 and which may be provided with alignment features as described herein are within the scope of this disclosure. A non-limiting example of such an additional or alternative layer is a touch-sensitive layer that may be provided as part of a touch-sensitive display.

Figure 3:
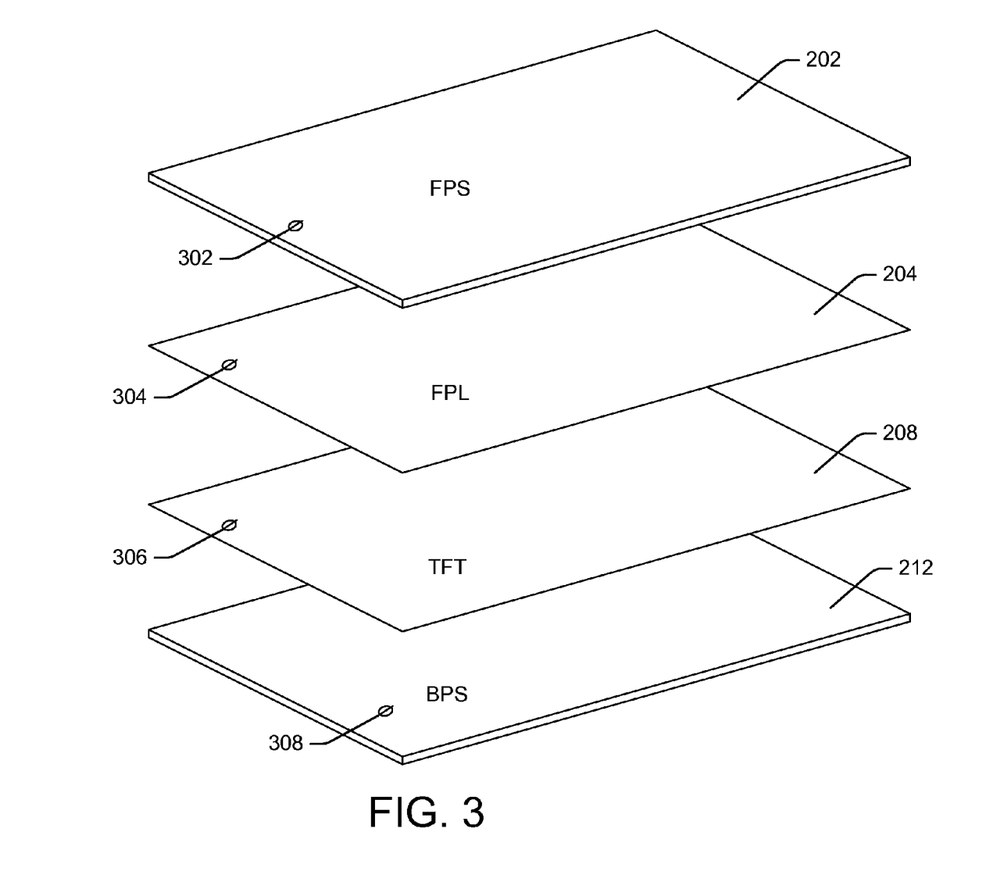
FIG. 3 schematically depicts an exploded view of illustrative layered components depicted in FIG. 2 provided with alignment features in accordance with one or more example embodiments of the disclosure.
Figure 4A:
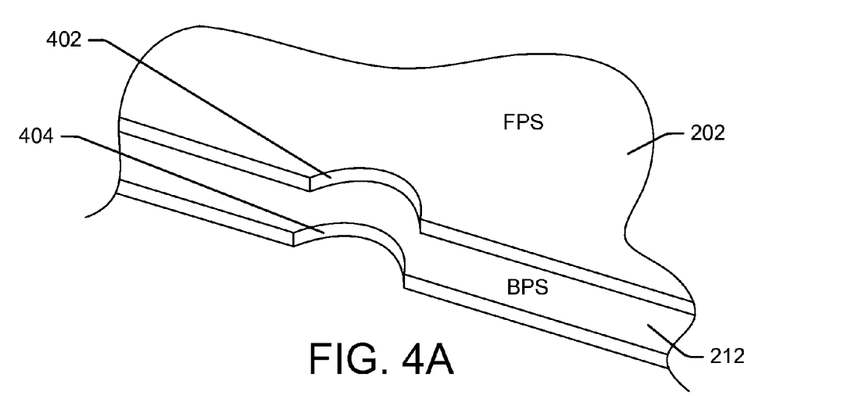
FIGS. 4A-4C schematically depict various illustrative alignment features in accordance with one or more example embodiments of the disclosure.
Figure 4B:
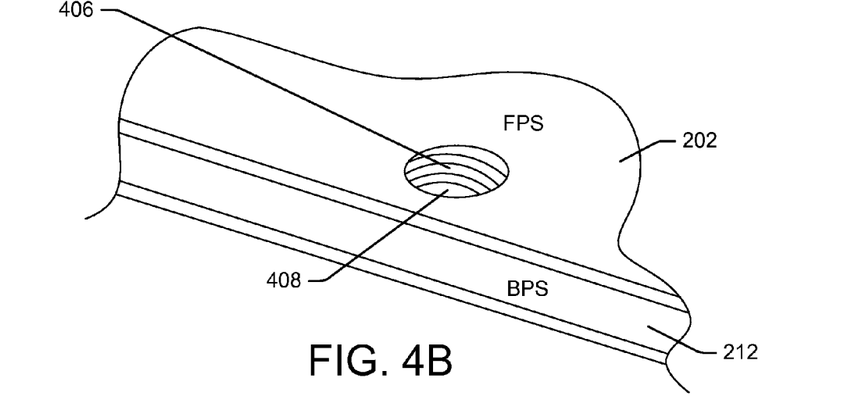
Figure 4C:
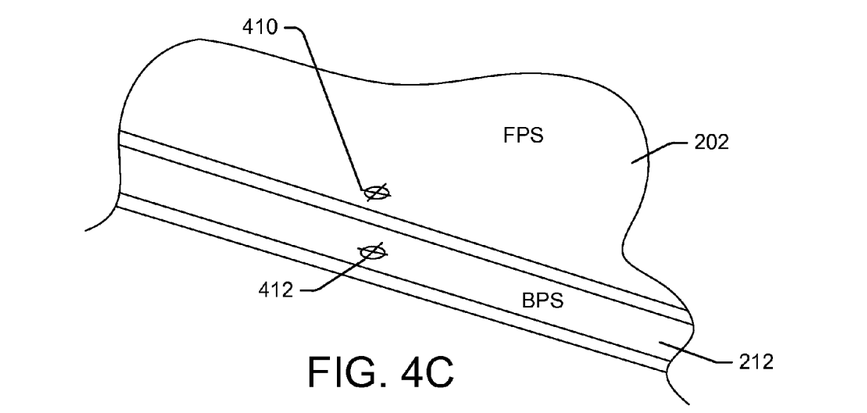

In accordance with one or more example embodiments of the disclosure, in order to facilitate proper alignment of the FPS 202 and BPS 212 to the ITO sub-layer of the FPL layer 204 and the TFT layer 208, respectively, the FPS 202 and the BPS 212 may each be provided with a respective one or more alignment features. FIG. 3 schematically depicts an exploded view of illustrative layered components of the display assembly 200 depicted in FIG. 2 provided with alignment features in accordance with one or more example embodiments of the disclosure. FIGS. 4A-4C schematically depict various illustrative alignment features in accordance with one or more example embodiments of the disclosure.

In FIG. 3, the FPS 202 and the BPS 212 are depicted as being provided with respective alignment features 302 and 308. In certain example embodiments, the alignment features 302, 308 may include mechanical features that are die-cut into the protective sheets as part of a die-cut process for forming the protective sheets. In additional or alternative example embodiments, the alignment features 302, 308 may be printed on or etched into one or both of the FPS 202 or the BPS 212 using a chemical or laser printing or etching process.

The alignment features 302, 308 may take on any suitable form. For example, the alignment features 302, 308 may each include any of an aperture, slot, notch, indentation, printed marking, etched marking, or the like. The alignment features 302, 308 may be formed on, in, or through any portion of the FPS 202 and the BPS 212. Although alignment feature 302 is shown as being offset with respect to alignment feature 308 in a direction extending along shorter edges of the FPS 202 and the BPS 212, the alignment features 302, 308 may be provided at any locations of the FPS 202 and BPS 212. For example, in certain example embodiments, the alignment feature 302 may be provided at a first location of the FPS 202 and the alignment feature 308 may be provided at a second location of the BPS 212 such that the second location is at a same relative position of the BPS 212 as the first location is with respect to the FPS 202. In addition, while individual alignment features 302, 308 are depicted in FIG. 3, it should be appreciated that each of the FPS 202 and the BPS 212 may be provided with respective multiple alignment features that may be arranged in any suitable configuration.

In one or more example embodiments of the disclosure, the alignment features 302, 308 may facilitate alignment of the FPS 202 and BPS 212, respectively, to the display sub-assembly. For example, the alignment feature 302 formed on, in, or through the FPS 202 may be utilized by an alignment system as a reference point for aligning the FPS 202 with respect to the ITO sub-layer of the FPL layer 204. Similarly, the alignment feature 308 formed on, in, or through the BPS 212 may be utilized as a reference point to align the BPS 212 with respect to the TFT layer 208. As previously noted, one or both of the FPS 202 and the BPS 212 may each include multiple alignment features that may collectively serve as reference points for alignment of the FPS 202 and/or the BPS 212 to a display sub-assembly.

In certain example embodiments, the alignment features 302, 308 formed on, in, or through the FPS 202 and BPS 212, respectively, may be utilized in conjunction with one or more pre-existing fiducial markers formed as part of other layered components of the display sub-assembly in order to ensure proper alignment between the FPS 202 and/or BPS 212 and these other layered components. For example, as depicted in FIG. 3, the TFT layer 208 may be provided with a fiducial marker 306 and the FPL layer 204 may be provided with a fiducial marker 304. The fiducial markers 304, 306 may be utilized by an alignment process that may include automated or manual steps (or a combination thereof) in order to align the FPL layer 204 to the TFT layer 208 and/or to align one or more both of the FPL layer 204 and the TFT layer 208 to other layered components. In addition, the fiducial markers 304, 306 may be utilized in conjunction with the alignment features 302, 308 in order to, for example, properly align the FPS 202 to the FPL layer 204 and properly align the TFT layer 208 to the BPS 212. Although each of the FPL layer 204 and the TFT layer 208 are depicted in FIG. 3 as being provided with individual fiducial markers 304 and 306, respectively, it should be appreciated that in various example embodiments of the disclosure, one or both of the FPL layer 204 and the TFT layer 208 may be provided with multiple respective fiducial markers. Further, in various example embodiments, one or more both of elements 304 and 306 may represent alignment features provided on, in, or through the FPL layer 204 and/or the TFT layer 208, and which may be used, potentially in combination with the alignment features 302, 308, to align the FPL layer 204 and/or the TFT layer 208 to respective protective sheets.

Providing protective sheets (e.g., FPS 202, BPS 212) that include alignment features (e.g., alignment feature 302, alignment feature 308) in accordance with example embodiments of the disclosure allows for highly accurate alignment of the protective sheets with respect to fiducial markers or alignment features (e.g., elements 304, 306) provided as part of the display layers to which such protective sheets are adhered. As such, the alignment features 302, 308 may be further utilized to align a cover glass (e.g., display panel 104) with the display assembly such that the active area of the display assembly accurately aligns with the viewing window of the cover glass. More specifically, in accordance with example embodiments of the disclosure, the alignment features 302, 308 of the FPS 202 and BPS 212 provide for a more accurate alignment of the FPS 202 and BPS 212 with respect to the respective fiducial markers or alignment features 304, 306 of the FPL layer 204 and TFT layer 208 to which the protective sheets are adhered than is obtainable in conventional displays. This improved alignment achievable as a result of the alignment features 302, 308 may then be utilized to obtain a more accurate alignment of the cover glass 104 to the display assembly than is obtainable in conventional devices.

In one or more example embodiments of the disclosure, the respective alignment features 302, 308 of the FPS 202 and BPS 212 may be further utilized to obtain improved alignment of other device components (e.g., a front light, a device chassis 106, etc.) with respect to the display assembly. As such, the alignment features 302, 308 may be utilized in various downstream manufacturing and testing processes.

As previously described, in one or more example embodiments of the disclosure, other display layers (e.g., the FPL layer 204, the TFT layer 208, etc.) in addition to the FPS 202 and BPS 212 may be provided with alignment features. For example, the TFT layer 208, the FPL layer 204, and/or other layers of the display assembly may be provided with alignment features in addition to, or in lieu of, fiducial markers that may otherwise be provided for such layers. Alignment features provided for such additional display layers may further enhance or optimize alignment of layered components of a display in accordance with example embodiments of the disclosure.

FIGS. 4A-4C schematically depict various illustrative types of alignment features that may be provided for protective sheets or other layered components of a display assembly in accordance with one or more example embodiments of the disclosure. As depicted in FIG. 4A, in certain example embodiments, the FPS 202 may be provided with an alignment feature 402 and the BPS 212 may be provided with an alignment feature 404. The alignment features 402 and 404 are illustratively depicted as notches or slots that are formed in the FPS 202 and the BPS 212, respectively. As depicted in FIG. 4B, in other example embodiments of the disclosure, the FPS 202 may be provided with an alignment feature 406 and the BPS 212 may be provided with an alignment feature 408, which are illustratively depicted as holes or apertures that are formed in the FPS 202 and the BPS 212, respectively. The alignment features 402, 404 and the alignment features 406, 408 may be die-cut into the FPS 202 and BPS 212, respectively, as part of a die-cut process for forming the protective sheets.

In additional or alternative example embodiments, as depicted in FIG. 4C, the FPS 202 may be provided with an alignment feature 410 and the BPS 212 may be provided with an alignment feature 412. The alignment features 410, 412 may represent markings or other features that are printed on or etched into the FPS 202 and BPS 212, respectively, using a chemical or laser printing or etching process.

While illustrative types of alignment features are depicted in FIGS. 4A-4C, it should be appreciated that alignment features in accordance with example embodiments of the disclosure may take on any suitable form. For example, alignment features in accordance with example embodiments of the disclosure may include any suitable indicator forming in, on, or through a display layer that may be used to align that display layer with other components of a display assembly as well as other device components generally. Further, while the FPS 202 and the BPS 212 are each illustratively shown in FIGS. 4A-4C as including a single alignment feature, it should be appreciated that one or both of the FPS 202 and the BPS 212 may each include multiple alignment features that may be arranged in accordance with any suitable configuration. In addition, although the FPS 202 and BPS 212 are illustratively depicted in FIGS. 4A-4C, it should be appreciated that the example alignment features shown may be provided in, on, or through other layers of a display assembly.

Those of ordinary skill in the art will appreciate that the foregoing is provided by way of example only. While illustrative display components, alignment features, and configurations of display components and alignment features have been described, it should be appreciated that numerous other display and alignment feature configurations are within the scope of this disclosure. Further, other embodiments of the disclosure may include fewer or greater numbers of components than those that have been described.

Illustrative Processes

Figure 5:
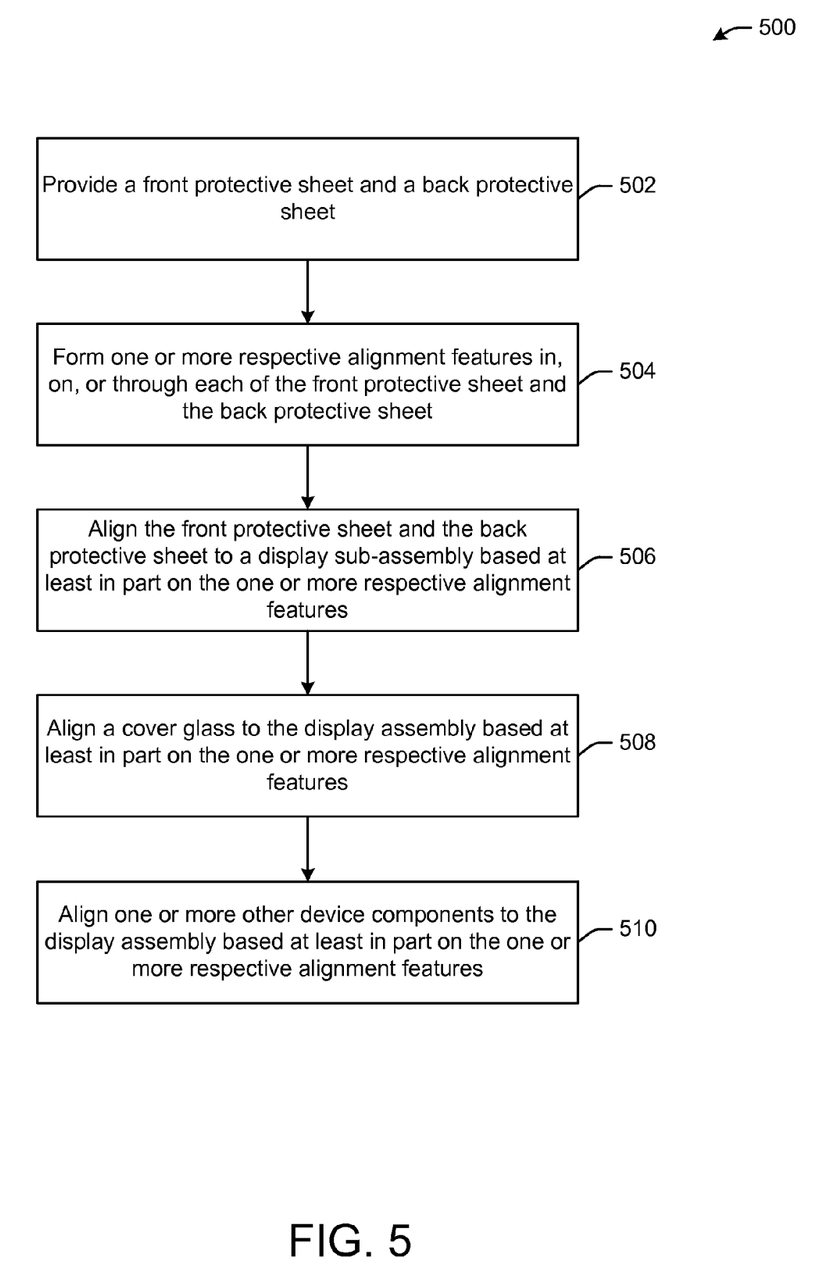
FIG. 5 is a process flow diagram of an illustrative method for forming alignment features in various layered components of a device display and utilizing the alignment features to align the display components in accordance with one or more example embodiments of the disclosure.

FIG. 5 is a process flow diagram of an illustrative method 500 for forming alignment features in various layered components of a device display and utilizing the alignment features to facilitate alignment of the display components in accordance with one or more example embodiments of the disclosure. The various illustrative operations of method 500 may be performed through one or more automated processes, one or more manual processes, or a combination thereof. Further, one or more automated systems such as an optical imaging and alignment system may be utilized to perform at least a portion of the operations.

At block 502, a front protective sheet and a back protective sheet may be provided. The front protective sheet and back protective sheet may correspond, for example, to the FPS 202 and BPS 212, respectively. The front protective sheet may be adhered to, for example, an ITO sub-layer of the FPL layer 204 using, for example, an adhesive such as an OCA. Similarly, the back protective sheet may be adhered to, for example, the TFT layer 208 using, for example, an OCA.

At block 504, one or more respective alignment features may be formed in, on, or through each of the front protective sheet and the back protective sheet. For example, one or more alignment features may be formed in the front protective sheet and a separate one or more alignment features may be formed in the back protective sheet. The alignment features may include any of the types of alignment features previously described including, but not limited to, an aperture, slot, notch, indentation, printed marking, etched marking, or the like. The alignment features may be formed using any suitable process including, but not limited to, die-cutting the alignment features into the protective sheets, laser printing the alignment features onto the protective sheets, or utilizing a laser or chemical etching process to etch the alignment features into the protective sheets. Further, as previously described, the alignment features may be formed in accordance with any suitable configuration that facilitates alignment of the protective sheets with respect to each other and other layered components of a display assembly.

At block 506, the front protective sheet and the back protective sheet provided with respective alignment features may be aligned with a display sub-assembly. More specifically, one or more alignment features formed on, in, or through the front protective layer may be utilized by an alignment system employing an alignment process in order to align the front protective sheet to, for example, the FPL layer 204. Similarly, one or more alignment features formed on, in, or through the back protective layer may be utilized by the alignment system to align the back protective sheet to, for example, the TFT layer 208. As previously described, the alignment features may be used in conjunction with one or more pre-existing fiducial markers formed on other layered components of the display sub-assembly and/or alignment features formed in, on, or through such other layered components (e.g., the FPL layer 204, the TFT layer 208, etc.) in order to facilitate alignment of the protective sheets to the display sub-assembly.

At block 508, the alignment features of the front protective sheet and/or the back protective sheet may be utilized to align a cover glass (e.g., display panel 104) to the display assembly. For example, because the alignment features facilitate accurate alignment of the protective sheets to the display sub-assembly, the same alignment features may be utilized to ensure accurate alignment of the cover glass to the display assembly such that accurate registration of the viewing window of the cover glass and the active area of the display assembly is obtained. At block 510, the alignment features of the protective sheets may be further utilized to obtain improved alignment of other device components (e.g., a front light, a device chassis, etc.) with respect to the display assembly. As such, the alignment features of the protective sheets may be utilized in various downstream manufacturing and testing processes.

In addition, in one or more example embodiments of the disclosure, other display layers in addition to the protective layers may be provided with alignment features as part of the method 500. For example, the TFT layer 208, the FPL layer 204, and so forth may be provided with alignment features in addition to, or in lieu of, fiducial markers that may otherwise be provided for such layers. Alignment features provided for such additional display layers may further enhance or optimize alignment of layered components of a display in accordance with example embodiments of the disclosure.

It should be appreciated that the various layered display components, alignment features, and configurations thereof described above are merely illustrative and not exhaustive and that numerous other variations are within the scope of this disclosure. It should further be appreciated that the operations described and shown in the method 500 of FIG. 5 may be carried out or performed in any suitable order. Additionally, in certain example embodiments, at least a portion of the operations may be carried out in parallel. Furthermore, in certain example embodiments, fewer than or more than the operations described in FIG. 5 may be performed.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be utilized in order to performed any of the operations described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An electronic display assembly, comprising:
    a first layer comprising electronic circuitry;
    a second layer adhered to the first layer, wherein the second layer comprises an electro-optic medium electrically coupled to the electronic circuitry; and
    a protective sheet adhered to the second layer,
wherein the protective sheet comprises an alignment feature for alignment of at least one of:
    i) the protective sheet to the first layer, ii) the protective sheet to the second layer, or
    iii) the electronic display assembly to a display panel; and
wherein the alignment feature defines a reference point for alignment of the front protective sheet to the second layer.

2. The electronic display assembly of claim 1, wherein at least a portion of the first layer and at least a portion of the second layer together comprise an active area configured to present visual information, and wherein a viewing opening of the display panel is aligned with respect to the active area based at least in part on the alignment feature.

3. The electronic display assembly of claim 1, wherein the alignment feature comprises one of: an aperture, a slot, a notch, a printed marking, or an etched marking.

4. The electronic display assembly of claim 1, wherein the display assembly is further aligned to at least one of: a casing configured to house the display assembly or a front illuminator configured to illuminate the display panel based at least in part on the alignment feature.

5. The electronic display assembly of claim 1, wherein the first layer comprises a glass substrate, and wherein the glass substrate comprises a thickness in the range of approximately 0.05 mm to 3 mm.

6. The electronic display assembly of claim 1, wherein the alignment feature is a first alignment feature, and the electronic display assembly further comprising:
    a touch-sensitive layer comprising a second alignment feature,
    wherein the touch-sensitive layer defines a reference point for alignment of the touch-sensitive layer to at least one of the protective sheet, the first layer, or the second layer.

7. The electronic display assembly of claim 1, wherein the protective sheet is a front protective sheet adhered to the second layer, and wherein the alignment feature defines a reference point for alignment of the front protective sheet to the second layer.

8. The electronic display assembly of claim 7, wherein the alignment feature is a first alignment feature and the reference point defined by the first alignment feature is a first reference point for alignment of the front protective sheet to the second layer, and wherein the second layer comprises at least one of: i) a second alignment feature or ii) a fiducial marker that defines at least a second reference point for alignment of the front protective sheet to the second layer.

9. The electronic display assembly of claim 7, wherein the alignment feature is a first alignment feature, the display assembly further comprising:
    a back protective sheet adhered to the first layer, wherein the back protective sheet comprises a second alignment feature that defines a reference point for alignment of the back protective sheet to the first layer.

10. The electronic display assembly of claim 9, wherein the second reference point defined by the second alignment feature is a first reference point for alignment of the back protective sheet to the first layer, and wherein the second layer comprises at least one of i) an additional alignment feature or ii) a fiducial marker that defines a second reference point for alignment of the back protective sheet to the first layer.

11. The electronic display assembly of claim 9, wherein a first edge surface of the back protective sheet extends beyond a second edge surface of the first layer, the electronic display assembly further comprising an edge sealant adjacent to the first edge surface and the second edge surface.

12. The electronic display assembly of claim 1, wherein the first layer is a thin-film transistor layer comprising a plurality of transistors and pixel elements, the second layer is a frontplane laminate layer, and the electro-optic medium comprises a plurality of microcapsules, each microcapsule comprising a plurality of electrically charged particles suspended in a fluid medium.

13. The electronic display assembly of claim 12, wherein the frontplane laminate layer comprises an electrode sub-layer, the display assembly further comprising:
an adhesive layer that adheres the protective layer to the electrode sub-layer.

14. The electronic display assembly of claim 13, wherein a first edge surface of the protective layer extends beyond a second edge surface of the electrode sub-layer, the electronic display assembly further comprising an edge sealant adjacent to the first edge surface and the second edge surface.

15. The electronic display assembly of claim 12, wherein the thin-film transistor layer comprises an electrode sub-layer, the display assembly further comprising:
an adhesive layer that adheres the frontplane laminate layer to the electrode sub-layer.

16. The electronic display assembly of claim 15, wherein a first edge surface of the frontplane laminate layer extends beyond a second edge surface of the electrode sub-layer, the electronic display assembly further comprising an edge sealant adjacent to the first edge surface and the second edge surface.

17. An electronic display assembly, comprising:
a first layer comprising electronic circuitry;
a second layer adhered to the first layer, wherein the second layer comprises an electro-optic medium electrically coupled to the electronic circuitry; and
a protective sheet adhered to the second layer,
wherein the protective sheet comprises an alignment feature for alignment of at least one of: i) the protective sheet to the second layer, or ii) the electronic display assembly to a display panel, and
wherein the alignment feature defines a reference point for alignment of the protective sheet to second layer, or for alignment of the electronic display assembly to the display panel.

18. The electronic display assembly of claim 17, wherein at least a portion of the first layer and at least a portion of the second layer together comprise an active area configured to present visual information, and wherein a viewing opening of the display panel is aligned with respect to the active area based at least in part on the alignment feature.

19. The electronic display assembly of claim 17, wherein the first alignment feature comprises one of an aperture, a slot, a notch, a printed marking, or an etched marking.

20. The electronic display assembly of claim 17, wherein the alignment feature is a first alignment feature, the display assembly further comprising:
a back protective sheet adhered to the first layer, wherein the back protective sheet comprises a second alignment feature that defines a reference point for alignment of the back protective sheet to the first layer.

21. The electronic display assembly of claim 20, wherein the alignment feature is a first alignment feature and the reference point defined by the first alignment feature is a first reference point for alignment of the front protective sheet to the second layer, and wherein the second layer comprises at least one of: i) a second alignment feature or ii) a fiducial marker that defines at least a second reference point for alignment of the front protective sheet to the second layer.

22. The electronic display assembly of claim 20, wherein the second reference point defined by the second alignment feature is a first reference point for alignment of the back protective sheet to the first layer, and wherein the second layer comprises at least one of i) an additional alignment feature or ii) a fiducial marker that defines a second reference point for alignment of the back protective sheet to the first layer.

* * * * *